(12) United States Patent
Ibi (10) Patent No.: US 8,190,009 B2
(45) Date of Patent: May 29, 2012

(54) OPTICAL APPARATUS AND CONTROL METHOD THEREOF, AND IMAGE PICKUP APPARATUS

(75) Inventor: Toshio Ibi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/917,850

(22) Filed: Nov. 2, 2010

(65) Prior Publication Data

US 2011/0158618 A1    Jun. 30, 2011

(30) Foreign Application Priority Data

Dec. 28, 2009  (JP) .................................. 2009-297679

(51) Int. Cl.
  *G03B 17/00* (2006.01)
  *H04N 5/228* (2006.01)
(52) U.S. Cl. .................. 396/55; 348/208.99; 348/208.11
(58) Field of Classification Search .................... 396/55; 348/208.99, 208.11
  See application file for complete search history.

(56) References Cited

U.S. PATENT DOCUMENTS

| 5,463,443 | A  | * | 10/1995 | Tanaka et al. .................... 396/55 |
| 6,631,042 | B2 |   | 10/2003 | Noguchi |
| 7,860,383 | B2 | * | 12/2010 | Nomura et al. .................. 396/55 |
| 2001/0028516 | A1 |   | 10/2001 | Noguchi |

FOREIGN PATENT DOCUMENTS

| JP | 07-270846 | 10/1995 |
| JP | 2001-290184 | 10/2001 |

\* cited by examiner

*Primary Examiner* — Rodney Fuller
(74) *Attorney, Agent, or Firm* — Cowan, Liebowitz & Latman, P.C.

(57) ABSTRACT

An optical apparatus capable of detecting an attitude of the apparatus in a state where no interference occurs between apparatus components, thereby preventing an error in the attitude detection. A shift lens drive controller of the optical apparatus detects a shake applied to the apparatus, calculates a movement target position of the shift lens based on a result of the detection, detects an actual position of the shift lens, and performs feedback control such that the actual position of the shift lens is converged to the movement target position. An attitude detector detects the attitude of the optical apparatus by using feedback control information, and an interference prevention controller prevents interference between the shift lens and other members.

14 Claims, 10 Drawing Sheets

OPTICAL APPARATUS AND CONTROL METHOD THEREOF, AND IMAGE PICKUP APPARATUS

BACKGROUND OF THE INVENTION

1. Field of the Invention

The present invention relates to an optical apparatus having a shake correction function and a control method thereof, and an image pickup apparatus.

2. Description of the Related Art

Optical hand shake correction is used to correct a shake applied to an optical apparatus, e.g., an image pickup apparatus such as a still camera and a video camera. In the optical hand shake correction, a shake is detected from an image formed on an image pickup device, a target position of a shift lens is determined based on a detected amount of shake, and the shift lens is moved to the target position in a direction perpendicular to an optical axis. At that time, e.g., feedback control is performed to reduce a deviation between the target position and an actual position to zero.

A mechanism for such shake correction should preferably have characteristics that a friction occurring therein is small, a target tracking ability thereof is excellent, and resonance frequencies thereof can easily be designed. A shake correction mechanism having such characteristics has been proposed (see, for example, Japanese Laid-open Patent Publication No. 2001-290184), in which a plurality of balls are held between a stationary barrel and a movable barrel that retains a shift lens, and the movable barrel is urged by a spring toward the stationary barrel.

With the shake correction mechanism disclosed in Japanese Laid-open Patent Publication No. 2001-290184, if each ball is located between limit ends of a ball receiving portion of the stationary barrel, a rolling friction state can be realized where the balls roll with movement of the movable barrel. On the other hand, if some ball remains pressed against the limit end, the rolling friction state changes to a sliding friction state in which the target tracking ability is lowered. To obviate this, the proposed shake correction mechanism performs a reset operation to drive the movable barrel to a movable limit and then returns the movable barrel to its center position, so that each ball is positioned to a central position between the limit ends.

Japanese Laid-open Patent Publication No. 7-270846 discloses a camera having a shake correction mechanism configured to be initialized by placing a shift lens at a predetermined position when a battery is mounted to the camera.

In recent years, the optical apparatus, e.g., the image pickup apparatus, is made more compact and thinner, and therefore when a lens barrel is retracted, distances between component parts of the apparatus become small. As a result, a shift lens unit sometimes interferes with a counterpart component and becomes unmovable. If a drive force for the shift lens unit varies due to interference between component parts of the image pickup apparatus, an error is caused when detecting an attitude of the apparatus based on a signal representing the drive force for the shift lens unit.

SUMMARY OF THE INVENTION

The present invention provides an optical apparatus and a control method thereof and an image pickup apparatus, which are capable of performing barrel retraction and expansion in such a manner that no interference occurs between component parts of the apparatus, thereby preventing erroneous attitude detection.

According to a first aspect of this invention, there is provided an optical apparatus comprising a lens barrel configured to be capable of being changed over between a retracted state and an expanded state for photographing, the lens barrel including a zoom unit for performing a zooming operation, a zoom drive control unit for performing drive control of the zoom unit, a correction member movable in a direction perpendicular to an optical axis, and a drive unit for driving the correction member, a shake detection unit configured to detect a shake applied to the optical apparatus, a feedback control unit configured to calculate a correction amount for shake correction based on an output from the shake detection unit and to drive the drive unit based on the calculated correction amount, and an interference prevention control unit configured to calculate an interference region between the correction member and another member based on an output from the feedback control unit during calculation of the correction amount and position information from the zoom drive control unit, wherein the interference prevention control unit gives the drive unit an instruction to move the correction member to a position where no interference with the other member occurs.

According to a second aspect of this invention, there is provided an image pickup apparatus comprising a lens barrel configured to be capable of being changed over between a retracted state and an expanded state for photographing, the lens barrel including a zoom unit for performing a zooming operation, a zoom drive control unit for performing drive control of the zoom unit, a correction member movable in a direction perpendicular to an optical axis, and a drive unit for driving the correction member, a shake detection unit configured to detect a shake applied to the image pickup apparatus, a feedback control unit configured to calculate a correction amount for shake correction based on an output from the shake detection unit and to drive the drive unit based on the calculated correction amount, and an interference prevention control unit configured to calculate an interference region between the correction member and another member based on an output from the feedback control unit during calculation of the correction amount and position information from the zoom drive control unit, wherein the interference prevention control unit gives the drive unit an instruction to move the correction member to a position where no interference with the other member occurs.

According to a third aspect of this invention, there is provided a control method of the optical apparatus described in the first aspect.

With this invention, barrel retraction and expansion can be carried out such that no interference occurs between component parts of the apparatus, whereby erroneous attitude detection can be prevented.

Further features of the present invention will become apparent from the following description of an exemplary embodiment with reference to the attached drawings.

DESCRIPTION OF THE EMBODIMENTS

The present invention will now be described in detail below with reference to the drawings showing a preferred embodiment thereof.

Figure 1:
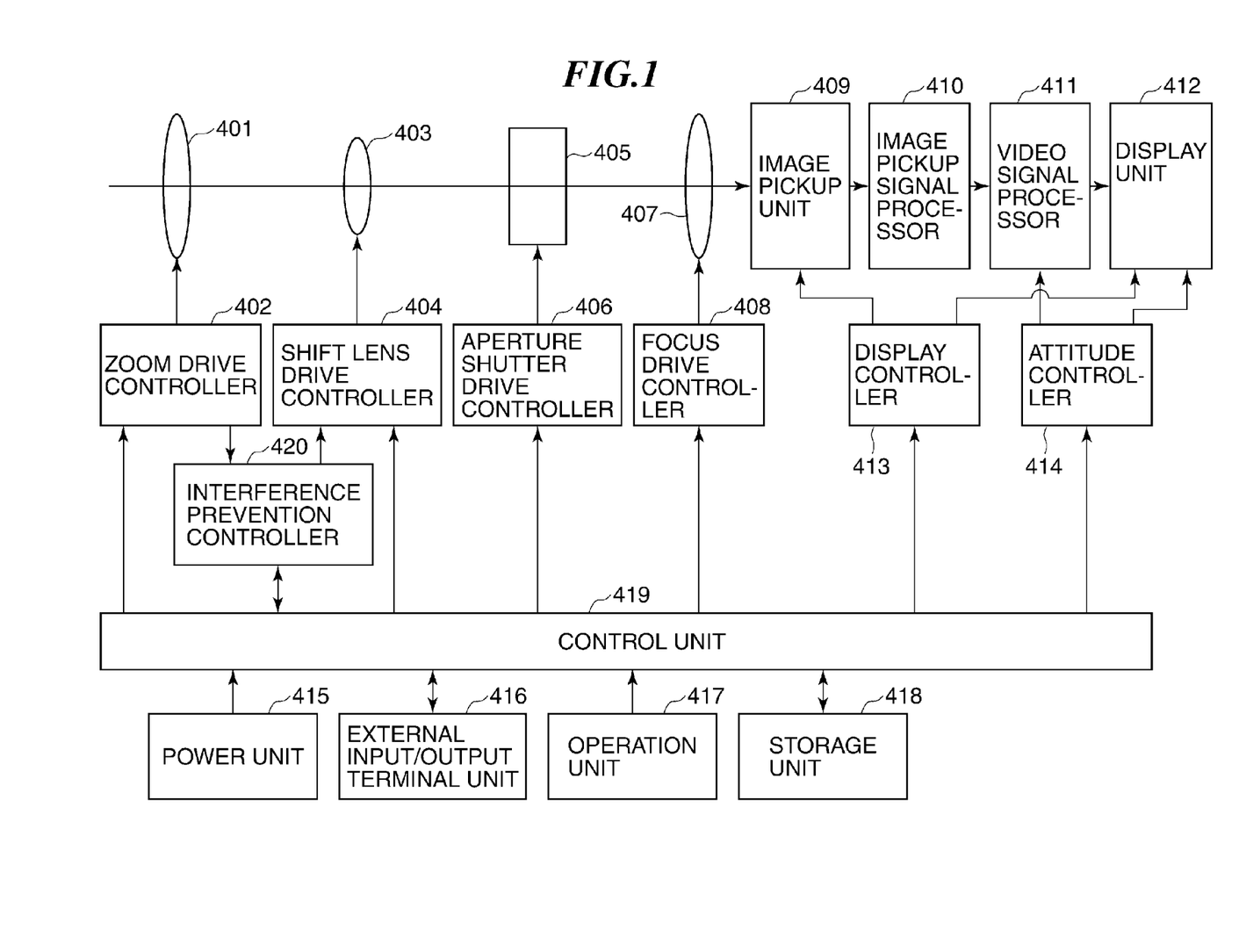
FIG. 1 is a view schematically showing the construction of an image pickup apparatus according to one embodiment of this invention.

FIG. 1 schematically shows the construction of an image pickup apparatus as an optical apparatus according to one embodiment of this invention. The optical apparatus is mainly comprised of a lens barrel of a digital camera having a shake correction function.

A zoom unit 401 includes a zoom lens for a zooming operation. A zoom drive controller 402 performs drive control of the zoom unit 401. A shift lens 403 is a correction member that is movable in a direction perpendicular to an optical axis. A shift lens drive controller 404 performs drive control of the shift lens 403. For example, at the time of power saving, the zoom drive controller 402 stops power supply to the zoom unit 401 and the shift lens drive controller 404 stops power supply to the shift lens 403.

An aperture shutter unit 405 performs aperture and shutter operations for the optical system. An aperture shutter drive controller 406 performs drive control of the aperture shutter unit 405. A focus unit 407 includes a focus lens, and performs a focusing adjustment. A focus drive controller 408 performs drive control of the focus unit 407. An image pickup unit 409 includes an image pickup device such as CCD or CMOS, and converts an optical image having passed through lens groups into an electrical signal.

An image pickup signal processor 410 converts the electrical signal output from the image pickup unit 409 into a video signal. According to the purpose of use of the video signal, a video signal processor 411 processes the video signal output from the image pickup signal processor 410.

Based on the signal output from the video signal processor 411, a display unit 412 displays an image on its display device, as needed. An attitude controller 414 sets the attitude of the image pickup apparatus to the video signal processor 411 and to the display unit 412. Operations of the image pickup unit 409 and the display unit 412 are controlled by a display controller 413.

A power unit 415 supplies power to various parts of the image pickup apparatus. An external input/output terminal unit 416 inputs and outputs a communication signal and a video signal from and to the outside. An operation unit 417 includes buttons, dials, touch panel, etc., which are used to operate the image pickup apparatus. For example, by operating a power switch, power supply from the power unit 415 to the image pickup apparatus is turned on and off. By operating the touch panel, either a still image photographing mode or a moving image photographing mode can be selected and operation conditions of actuators of the image pickup apparatus at each photographing mode can be set. The operation unit 417 has a shutter release button (not shown) for being depressed to sequentially turn on first and second switches. The first switch is turned on when the shutter release button is half depressed, and the second switch is turned on when the shutter release button is fully depressed. A storage unit 418 stores various data such as video information obtained by photographing. A control unit 419 controls the entire image pickup apparatus. For example, the control unit 419 drives the controllers (such as the zoom drive controller 402, shift lens drive controller 404, aperture shutter drive controller 406, and focus drive controller 408) that drive lens groups, thereby changing a zoom position. An interference prevention controller 420 performs control such that the shift lens 403 does not interfere with other members.

Next, a description will be given of operations of the image pickup apparatus having the above-described construction.

When the first switch of the operation unit 417 is turned on, the focus drive controller 408 drives the focus unit 407 to perform a focusing adjustment, and the aperture shutter drive controller 406 drives the aperture shutter unit 405 to set a desired amount of exposure. When the second switch of the operation unit 417 is turned on, an optical image is exposed to the image pickup unit 409, and image data obtained based on an electrical signal converted from the optical image by the image pickup device is stored into the storage unit 418.

At that time, if a shake correction enable instruction is given from the operation unit 417, the control unit 419 instructs the shift lens drive controller 404 to perform a shake correcting operation. In response to the instruction, the shift lens drive controller 404 performs the shake correcting operation until a shake correction disable instruction is given. While referring to position information from the zoom drive controller 402, the interference prevention controller 420 instructs the shift lens drive controller 404 to operate such that interference does not occur between the shift lens 403 and another member.

If an instruction to perform a zooming operation by the zoom lens is given via the operation unit 417, the zoom drive controller 402 receives the instruction via the control unit 419 and drives the zoom unit 401 to move the zoom lens to an instructed zoom position. Furthermore, based on image information processed by the image pickup signal processor 410 and the video signal processor 411, the focus drive controller 408 drives the focus unit 407 to perform a focusing adjustment.

Figure 2:
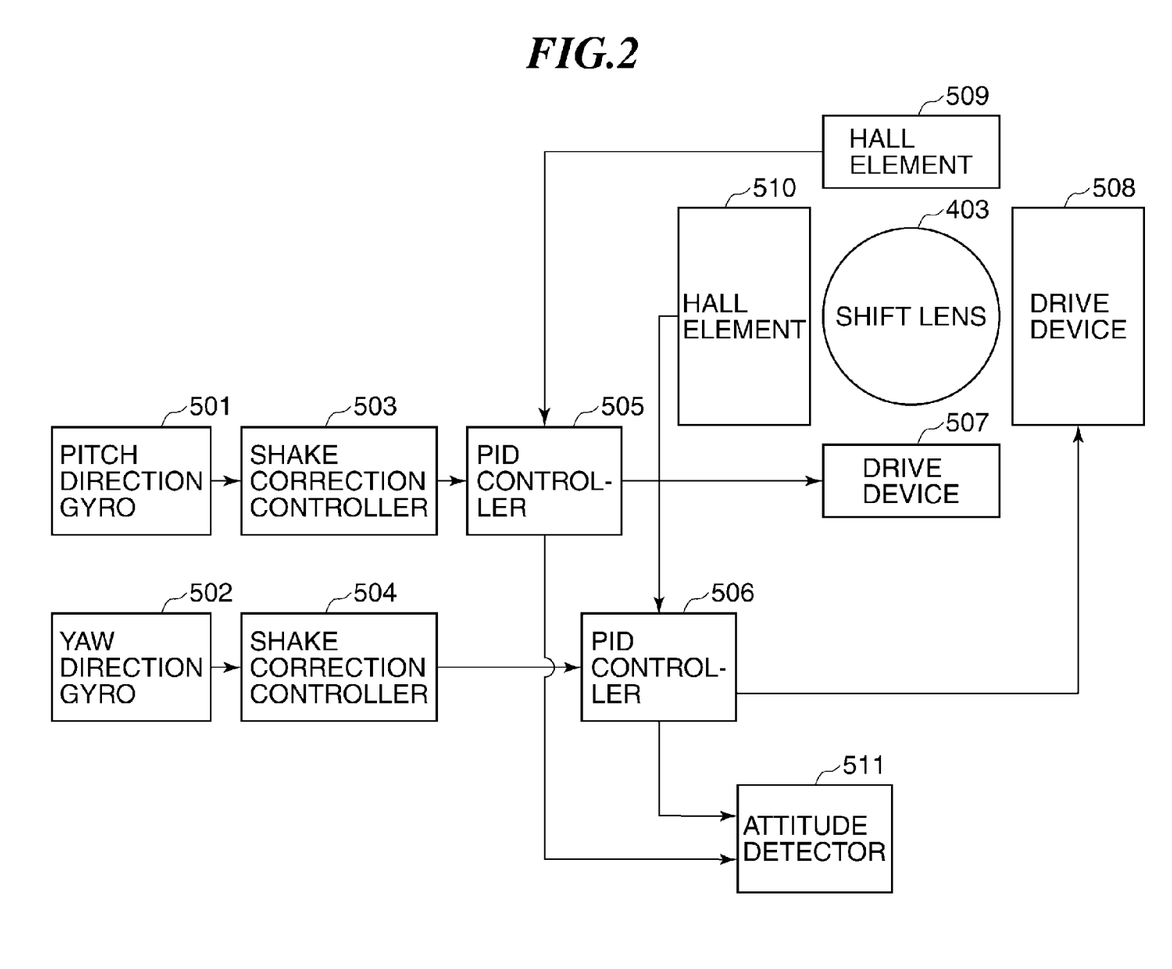
FIG. 2 is a block diagram showing the internal construction of a shift lens drive controller shown in FIG. 1.

FIG. 2 shows in block diagram the internal construction of the shift lens drive controller 404. The shift lens drive controller 404 includes a pitch direction gyro 501 and a yaw direction gyro 502, as a shake detection unit for detecting a shake applied to the image pickup apparatus. The pitch direction gyro 501 detects a shake of the image pickup apparatus in a vertical direction (pitch direction) from a normal attitude of the apparatus (i.e., an attitude in which the lengthwise direction of an image frame is nearly coincident with a horizontal direction). The yaw direction gyro 502 detects a shake of the image pickup apparatus in the horizontal direction (yaw direction) from the normal attitude of the apparatus.

The shake correction controller 503 calculates a shift lens compensation position control signal for the pitch direction based on the shake detected by the pitch direction gyro 501. The shake correction controller 504 calculates a shift lens compensation position control signal for the yaw direction based on the shake detected by the yaw direction gyro 502.

PID controllers 505 and 506, as a feedback control unit, obtain controlled variables from a deviation between the shift lens compensation position control signal for the pitch direction and a positional signal representing the position of the shift lens 403 and from a deviation between the shift lens compensation position control signal for the yaw direction and the positional signal, and output position command signals. Drive devices 507, 508 are a drive unit for driving the shift lens 403 based on the position command signals delivered from the PID controllers 505, 506. Hall elements 509, 510 are a position detection unit for detecting the positions of the shift lens 403 in the pitch direction and in the yaw direction. An attitude detector 511 detects the attitude of the image pickup apparatus based on control signals which are used in the PID controllers 505, 506.

Figure 3:
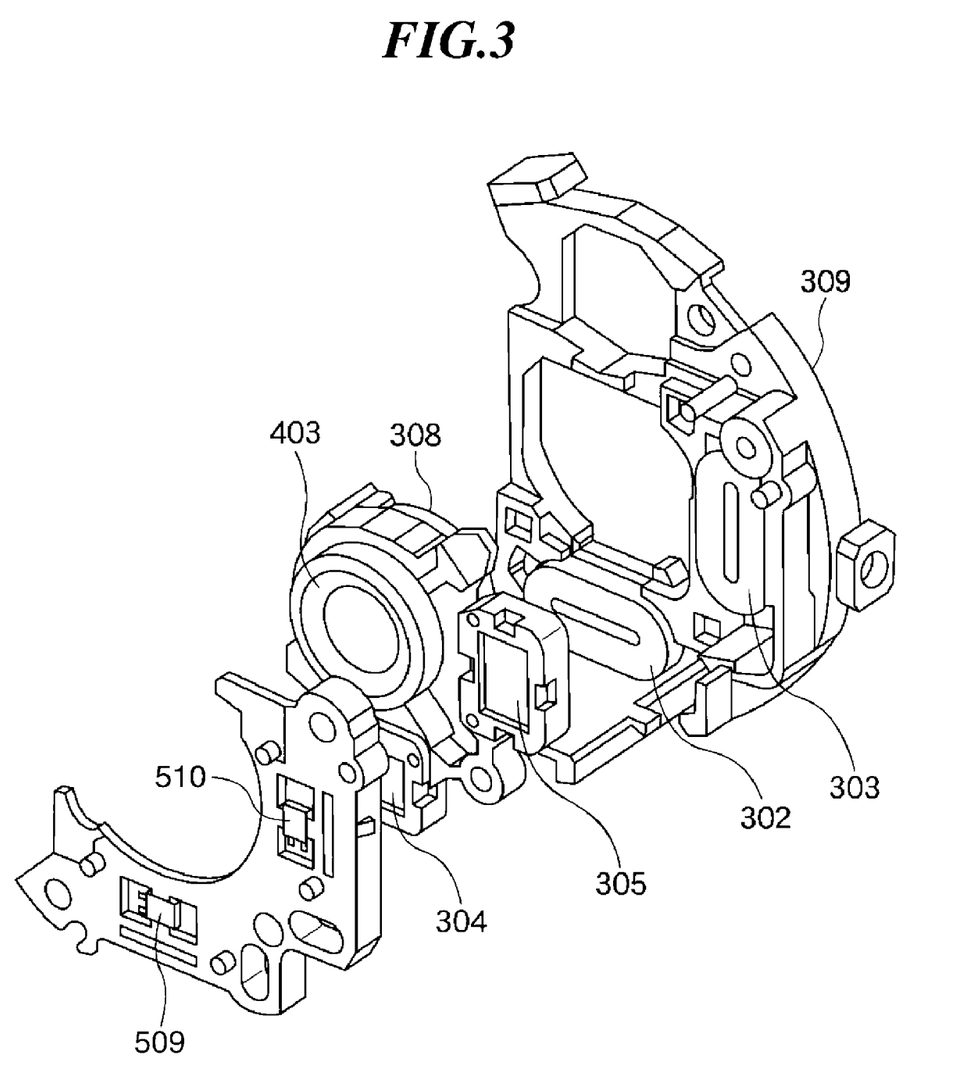
FIG. 3 is an exploded perspective view showing the construction of a shake correcting unit of the image pickup apparatus.

Next, a description will be given of position control for the shift lens 403 performed by the shift lens drive controller 404. FIG. 3 shows in perspective view the construction of a shake correcting unit in which the shift lens 403 is held to be movable in a direction nearly perpendicular to the optical axis.

In the shake correcting unit, magnetic fields are generated by supplying electric power to drive coils 302, 303, whereby drive magnets 304, 305 integrally formed with the shift lens 403 are driven. In other words, the shake correcting unit has a so-called voice coil motor structure. The shift lens 403 and the drive magnets 304, 305 are held by a support 308, and the drive coils 302, 303 are held by a frame 309. The support 308 is urged toward the frame 309 via rolling members (rolling balls) and is movable in a direction perpendicular to the optical axis, as will be described later with reference to FIG. 4.

The Hall elements 509, 510 detect magnetic fields generated by the drive magnets 304, 305, as positional signals representing the actual position of the shift lens 403, and deliver the detected position signals to respective ones of the PID controllers 505, 506. The PID controllers 505, 506 perform feedback control such that position signals are respectively converged to the compensation position control signals delivered from the shake correction controllers 503, 504.

Figure 4:
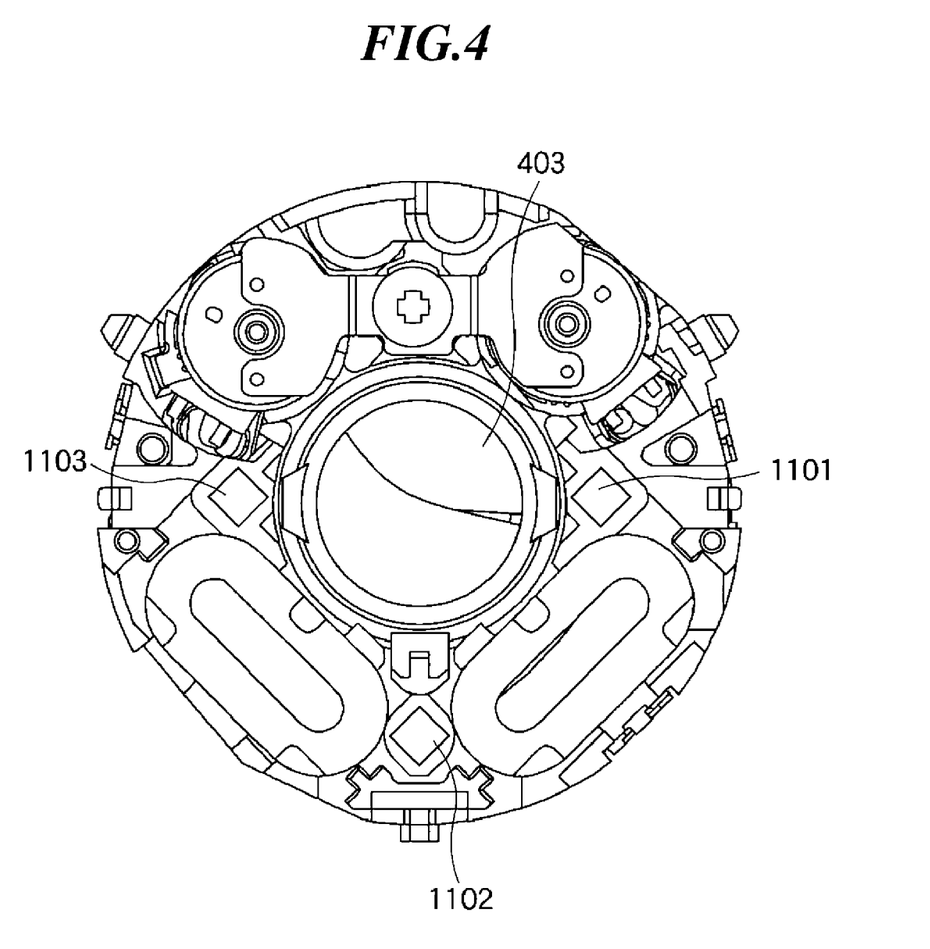
FIG. 4 is a front view of the shake correcting unit as seen from an object side.

FIG. 4 shows the shake correcting unit of FIG. 3 as seen from front, i.e., as seen from the object side. Recesses 1101, 1102, and 1103 are provided around the shift lens 403 so as to be positioned at respective apexes of a triangle, and one rolling ball (e.g., a ceramic ball) is disposed within each of the recesses 1101 to 1103. One or more urging members (e.g., springs), not shown, are provided between the support 308 and the frame 309, so that the rolling balls are held therebetween. Specifically, the support 308 is urged toward the frame 309 via the rolling balls and is movable in a direction perpendicular to the optical axis. It should be noted that the recesses 1101 to 1103 can be formed in either the support 308 or the frame 309 or in both of them.

In the structure shown in FIGS. 3 and 4, it is preferable that the rolling balls always be in a rolling state. This is because, if the rolling balls are in contact with end surfaces of the recesses 1101 to 1103, a sliding friction becomes dominant and the tracking ability is lowered. To place the rolling balls in the rolling state, an initialization is performed by the interference prevention controller 420, as will be described later. It should be noted that since the position signals output from the Hall elements 509, 510 have individual differences (variations), it is necessary to adjust the outputs from the Hall elements 509, 510 relative to compensation position control signals such that the shift lens 403 can be moved to a predetermined position.

The following is a description of PID control. PID control is a kind of feedback control and controls an input value according to three elements (i.e., a deviation between an output value and a target value, integration of the deviation, and differentiation of the deviation). In the PID control, an action to change the input value in proportion to the deviation is called a proportional action or a P-action.

The proportional action controls the input value as a linear function of the deviation between output value and target value. Specifically, assuming that input value, output value, and target value at a given time t are respectively represented by x(t), y(t), and y0, the following formula (1) is fulfilled.

$$x(t) = K_p(y(t) - y0) + x0 \quad (1)$$

Symbol x0 represents an input value required to fulfill formula (1) when y(t) is equal to y0, and symbol Kp represents a constant which is called the proportional gain.

When assuming that $\Delta x(t) = x(t) - x0$ and $\Delta y(t) = y(t) - y0$, the following formula (2) is fulfilled. An action to vary the input value in proportion to deviation $\Delta y(t)$ is called the proportional action or the P-action.

$$\Delta x(t) = K_p \Delta y(t) \quad (2)$$

In actual control, the input value must sometimes be changed even for the same output value depending on surrounding environment, etc. On the other hand, in the proportional control, the input value always remains the same relative to the output value provided that Kp does not change, and therefore the output value cannot reach a target value, resulting in a residual deviation or offset. To eliminate the residual deviation, a term is added as shown by a second term of the following formula (3).

$$\Delta x(t) = K_p \Delta y(t) + K_i \int_0^t \Delta y(\tau) d\tau \quad (3)$$

If there is a residual deviation, the second term of the formula (3) acts to change the input value in proportion to the integral time of the residual deviation. Specifically, the longer time the deviation lasts, the larger the input value is changed by the second term, whereby the input value is made close to the target value. This action is called the integral action or I action.

A combination of the proportional action and integral action is called the PI control, and a constant Ki is called the integral gain. In some cases, the output value abruptly changes due to a change in surrounding environment or due to a disturbance applied to the control object. In such a case, the PI control attempts to make the output value close to the target value. However, the I action has a phase delay and does not effectively act before lapse of a certain time period, and therefore it takes much time for the output value to reach the target value. Thus, a term is added as shown by a third term of the following formula (4).

$$\Delta x(t) = K_p \Delta y(t) + K_i \int_0^t \Delta y(\tau) d\tau + K_d \frac{d \Delta y(t)}{dt} \quad (4)$$

If the output value abruptly changes, the third term of formula (4) changes the input value by an amount proportional to the magnitude of the change in the output value so as to cancel the change. This action is called the differentiation action or D action. A combination of the proportional action, integral action, and differentiation action is called the PID control.

As previously described with reference to FIG. 2, the shake correction controller 503 calculates the shift lens compensation position control signal for the pitch direction based on a shake signal from the pitch direction gyro 501. This control signal represents a movement target position (shake correction position) in the pitch direction. Similarly, the shift lens compensation position control signal for the yaw direction calculated by the shake correction controller 504 based on a shake signal from the yaw direction gyro 502 represents a movement target position (shake correction position) in the yaw direction.

Based on the shift lens compensation position control signals respectively output from the shake correction controllers 503, 504, the shift lens 403 is moved in a direction to correct an image shake caused by a shake of the image pickup apparatus. Specifically, the shift lens 403 used for shake correction is moved in a direction perpendicular to the optical axis, whereby an image shake can be prevented when a shake of the image pickup apparatus occurs.

Figure 5:
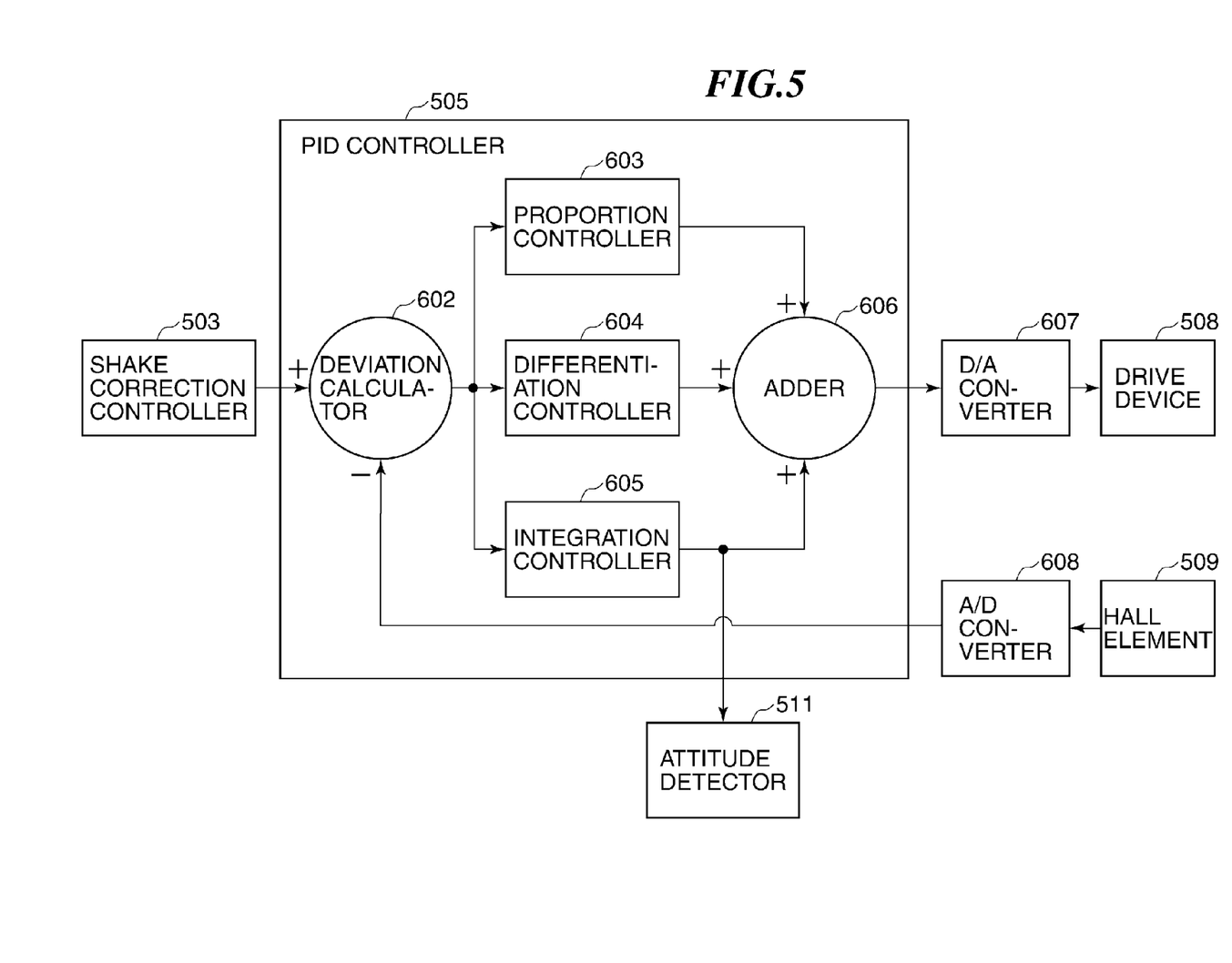
FIG. 5 is a block diagram showing in detail the construction of a PID controller shown in FIG. 2.

FIG. 5 shows in block diagram the details of the PID controller 505 shown in FIG. 2. The PID controllers 505, 506 differ in target position direction (pitch direction or yaw direction) from each other, but are the same in construction as each other. In the following, the PID controller 505 will be described as an example.

In the PID controller 505, a deviation calculator 602 calculates a difference (deviation) between the shake correction position of the shift lens 403 (which is the output value from the shake correction controller 503) and an actual position (digital signal) obtained by an A/D converter 608 by A/D converting the position signal of the shift lens 403 (which is the output value of the Hall element 509). Based on the calculated deviation, a proportion controller 603, a differentiation controller 604, and an integration controller 605 each perform a calculation.

The proportion controller 603 performs proportional control to make the deviation close to zero, i.e., make the actual position close to the shake correction position (movement target position). Since the proportional control always produces an offset component in the deviation, integral control to reduce the offset component to zero is performed by the integration controller 605.

When the attitude of the image pickup apparatus changes, i.e., when a direction of gravitational force applied to the shift lens 403 changes, the offset component varies according to the attitude change. The output of the integration controller 605 is delivered to the attitude detector 511 for detection of the attitude (inclination) of the image pickup apparatus. To enhance the response of the shift lens 403, the differentiation controller 604 performs differential control on the deviation.

Finally, the output of the proportion controller 603, the output of the differentiation controller 604, and the output of the integration controller 605 are added together by an adder 606. The output of the adder 606 is converted into an analog signal by a D/A converter 607 and delivered to a drive device 508 to drive the shift lens 403.

Figure 6:
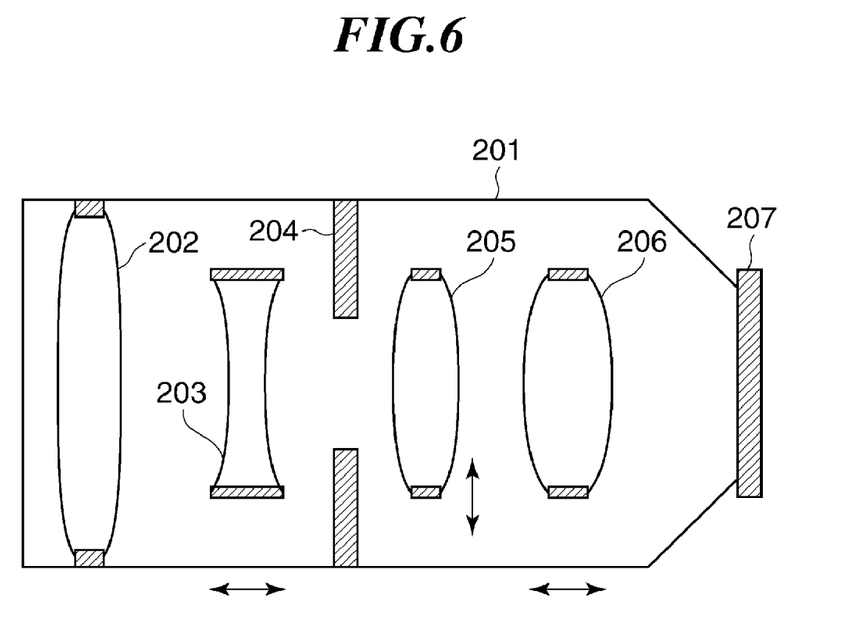
FIG. 6 is a view showing the construction of lens groups having a shake correction function.

FIG. 6 shows the construction of lens groups having a shake correction function in a state where the lens barrel 201 is expanded.

The barrel 201 can be changed over between an expanded state (in which photographing can be performed) and a retracted state (in which the barrel is stored and photographing is not performed), so that the entire barrel length can be changed. A first lens group 202, second lens group 203, aperture 204, third lens group 205, and fourth lens group 206 are disposed in the barrel 201. Positions of some of the lens groups in the optical axis direction change between the expanded state and the retracted state. Each lens group is comprised of one or more lenses.

The first lens group 202 is fixed to the barrel 201. The second lens group 203 is a zoom lens unit for performing a zooming operation, and is included in the zoom lens unit 401 shown in FIG. 1. The aperture 204 may be formed integrally with a shutter unit as in the aperture shutter unit 405 shown in FIG. 1, and may be disposed nearer to the image pickup device 207 than the third lens group 205 as viewed in the optical axis direction or may be disposed in the third lens group 205. The third lens group 205 has the shift lens 403 that is moved for shake correction in a direction perpendicular to the optical axis. The fourth lens group 206 has a function of correcting a focus surface created by the second lens group 203, and also has a focus adjustment function.

Light having passed through these lens groups forms an image on a surface of the image pickup device 207 included in the image pickup unit 409 shown in FIG. 1.

When the barrel 201 is brought into a retracted state (not shown), distances between the lens groups become small. As a result, interference (contact) sometimes occurs between some of the lens groups or between some of lens retainers that hold the lens groups.

Figure 7A:
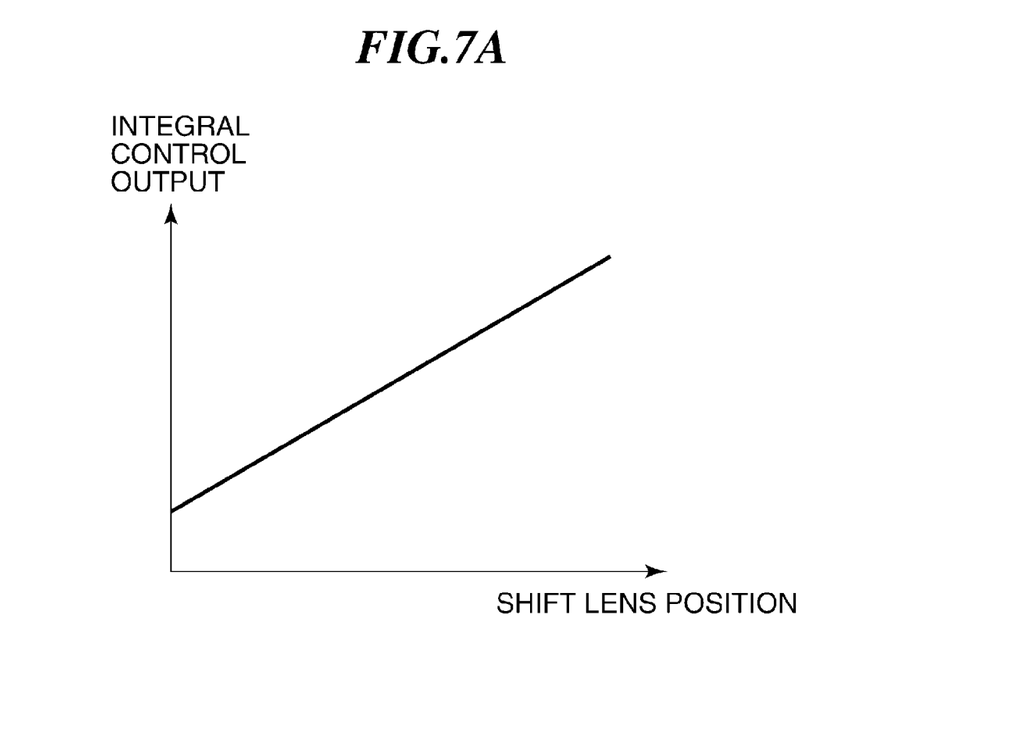
FIG. 7A is a graph showing an example output of an integration controller of the PID controller in a state where a shift lens does not interfere with another lens and a lens retainer.

FIG. 7A shows an example of the output of the integration controller 605 in a state where the barrel 201 is in an expanded state and the shift lens 403 does not interfere with another lens and a lens retainer. The integral control output changes as a linear function of the position of the shift lens 403 in the direction perpendicular to the optical axis, which is measured from the optical axis.

Figure 7B:
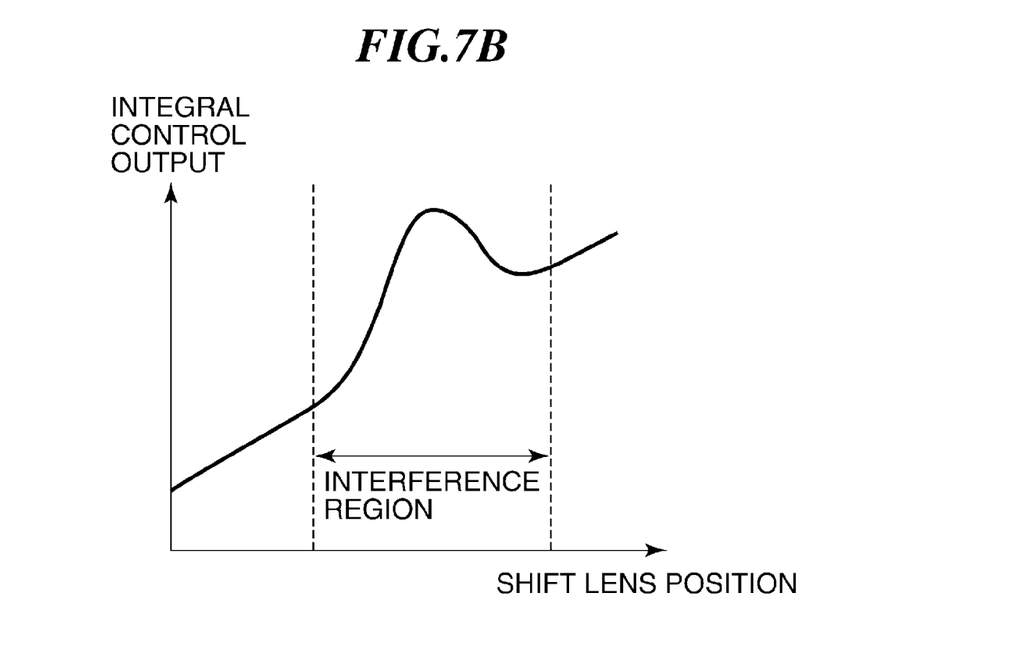
FIG. 7B is a graph showing an example output of the integration controller in a state where the shift lens interferes with another lens or a lens retainer.

FIG. 7B shows an example of the output of the integration controller 605 in a state where the barrel 201 is in the retracted state and the shift lens 403 interferes with another lens and a lens retainer. In an interference region, the drive force for the shift lens 403 abruptly changes and the integral control output also abruptly changes. Therefore, it is possible to make a discrimination between interference region and noninterference region based on a change in the integral control output.

Figure 8:
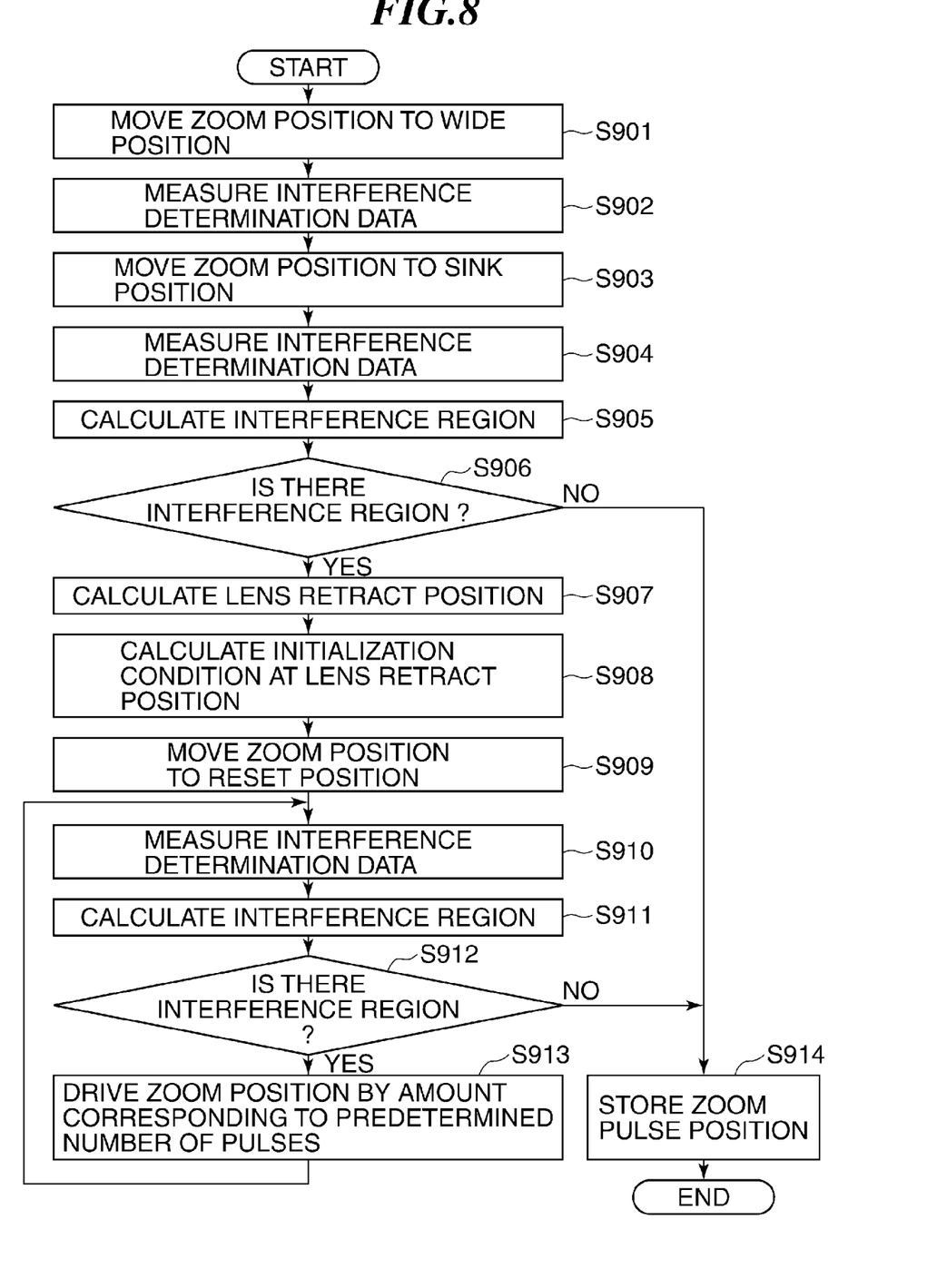
FIG. 8 is a flowchart showing an interference region determination process.

FIG. 8 shows in flowchart an interference region determination process. Since no interference occurs between component parts in a wide position (i.e., a zoom position that provides a lowest photography magnification in the expanded state of the barrel 201), it is possible to make a discrimination between interference region and noninterference region by comparing integral control output data at each zoom position with integral control output data at the wide position as a reference.

In step S901, the control unit 419 moves the zoom position to the wide position. In step S902, the interference prevention controller 420 measures integral control output data (interference determination data), thereby measuring the integral control output data at the wide position where no interference occurs between component parts. Next, in step S903, the control unit 419 moves the zoom position to a storage position (sink position) of the barrel 201. In step S904, the interference prevention controller 420 measures integral control output data (interference determination data) at the barrel storage position. In step S905, the interference prevention controller 420 compares the integral control output data measured in step S902 with that measured in step S904, thereby calculating an interference region.

Next, the interference prevention controller 420 determines whether there is an interference region (step S906). If there is no interference region (NO to step S906), the interference prevention controller 420 stores a zoom pulse position at the sink position (step S914), whereupon the present process is completed. On the other hand, if there is an interference region (YES to step S906), the interference prevention controller 420 calculates a retract position of the shift lens 403 (step S907). In step S908, the controller 420 calculates an initialization circular drive radius (a drive radius in a drive operation for initialization performed at the retract position calculated in step S907).

Insteps S909 to S914, a zoom pulse position where interference no longer occurs is detected.

In step S909, the interference prevention controller 420 causes the control unit 419 to move the zoom position to a reset position. In step S910, the controller 420 measures integral control output data (interference determination data). In step S911, the controller 420 compares the integral control output data measured in step S902 with that measured in step S910, thereby calculating an interference region. In step S912, the controller 420 determines whether there is an interference region.

If there is no interference region (NO to step S912), the interference prevention controller 420 stores a current zoom pulse position (step S914), whereupon the present process is completed. The pulse position at that time represents a zoom pulse position where interference no longer occurs. On the other hand, if there is an interference region (YES to step S912), the interference prevention controller 420 instructs, via the control unit 419, the zoom drive controller 402 to drive the zoom position by an amount corresponding to a predetermined number of pulses in the direction of barrel expansion (step S913), and returns to step S910.

By performing the process shown in FIG. 8, it is possible to calculate the retract position of the shift lens 403 in the barrel storage state, the initialization circular drive radius of the shift lens 403 at the retract position, and the zoom pulse position where interference does not occur.

Next, with reference to FIG. 9, a description will be given of a process for measurement of integral control output data (interference determination data) used in the interference region determination process in FIG. 8. In the following, a term "left-to-right direction" refers to a direction perpendicular to a longitudinal axis of the drive coil 303 shown in FIG. 3, and a term "vertical direction" refers to a direction perpendicular to a longitudinal axis of the drive coil 302 shown in FIG. 3.

In step S1001, the shift lens drive controller 404 moves the shift lens 403 to the left end of a movable range thereof. In step S1002, the controller 404 moves the shift lens 403 from one end to another end of a vertical movable range, and the interference prevention controller 420 acquires integral control outputs at respective shift lens positions. In step S1003, the shift lens drive controller 404 determines whether the measurement of integral control output up to the right end of the movable range of the shift lens 403 has been made.

If the measurement up to the right end is not completed (NO to step S1003), the shift lens drive controller 404 moves the shift lens 403 rightward by a predetermined amount (step S1004), and returns to step S1002. If the measurement up to the right end is completed (YES to step S1003), the flow proceeds to step S1005 where the shift lens drive controller 404 moves the shift lens 403 to the upper end of the movable range. In step S1006, the shift lens drive controller 404 moves the shift lens 403 from one end to another end of the movable range in the left-to-right direction in a state that the shift lens 403 has been moved to the upper end of the movable range, and the interference prevention controller 420 acquires integral control outputs at respective shift lens positions.

In step S1007, the shift lens drive controller 404 determines whether the measurement of integral control output up to the lower end of the movable range of the shift lens 403 has been made. If the measurement up to the lower end of the movable range is not completed, the shift lens drive controller 404 moves the shift lens 403 downward by a predetermined amount (step S1008), and returns to step S1006. If the measurement up to the lower end is completed, the present process is completed.

Figure 9:
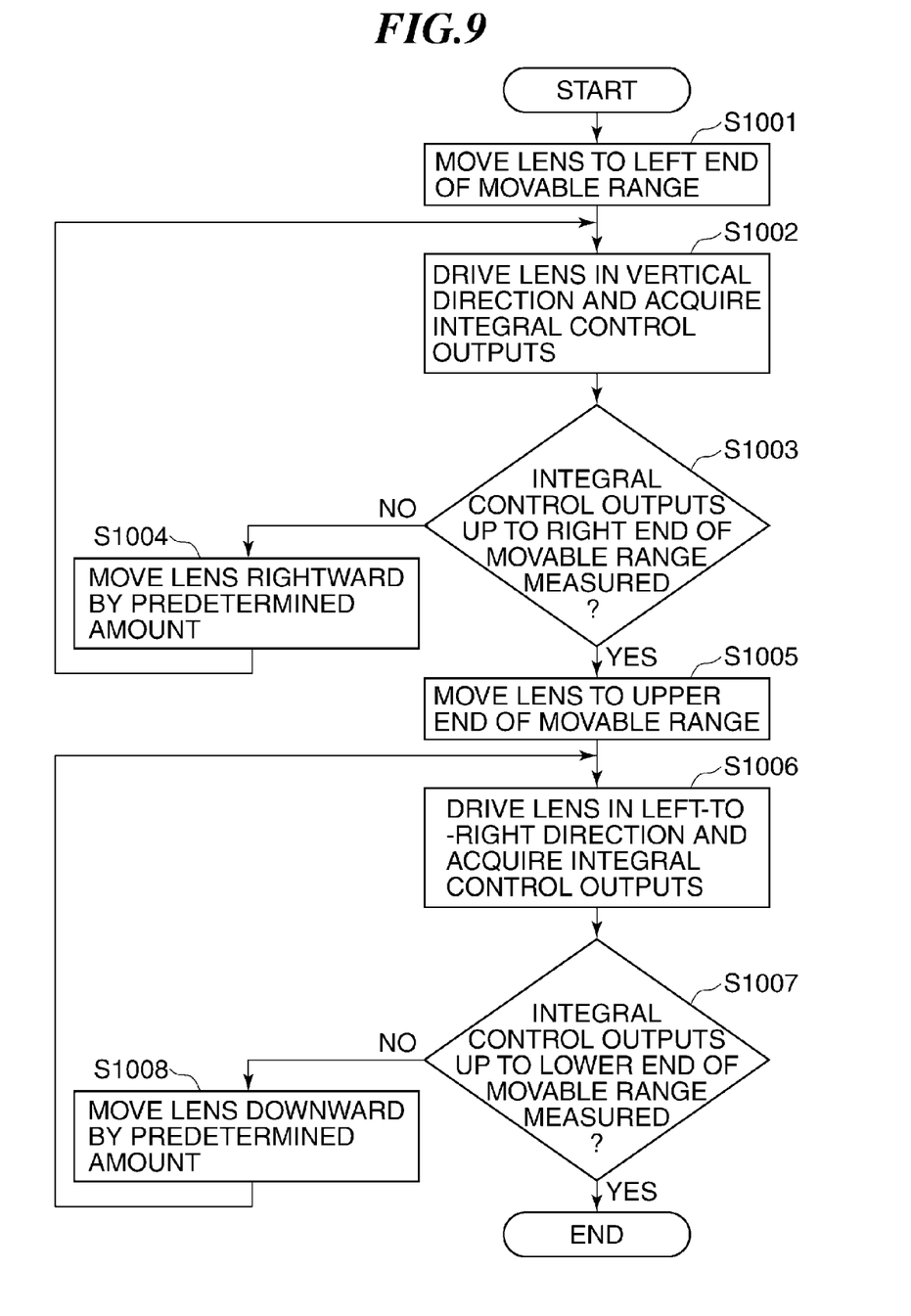
FIG. 9 is a flowchart showing a process for measurement of integral control output data used in the determination process in FIG. 8.

By performing the process shown in FIG. 9, it is possible to measure the integral control output data over the entire region in the vertical direction and in the left-to-right direction. Although the measurement is started from at the left end and at the upper end of the movable range in the process of FIG. 9, the measurement start position is not limited to the left and upper ends of the movable range as long as the integral control output data can be measured over the entire region.

Figure 10:
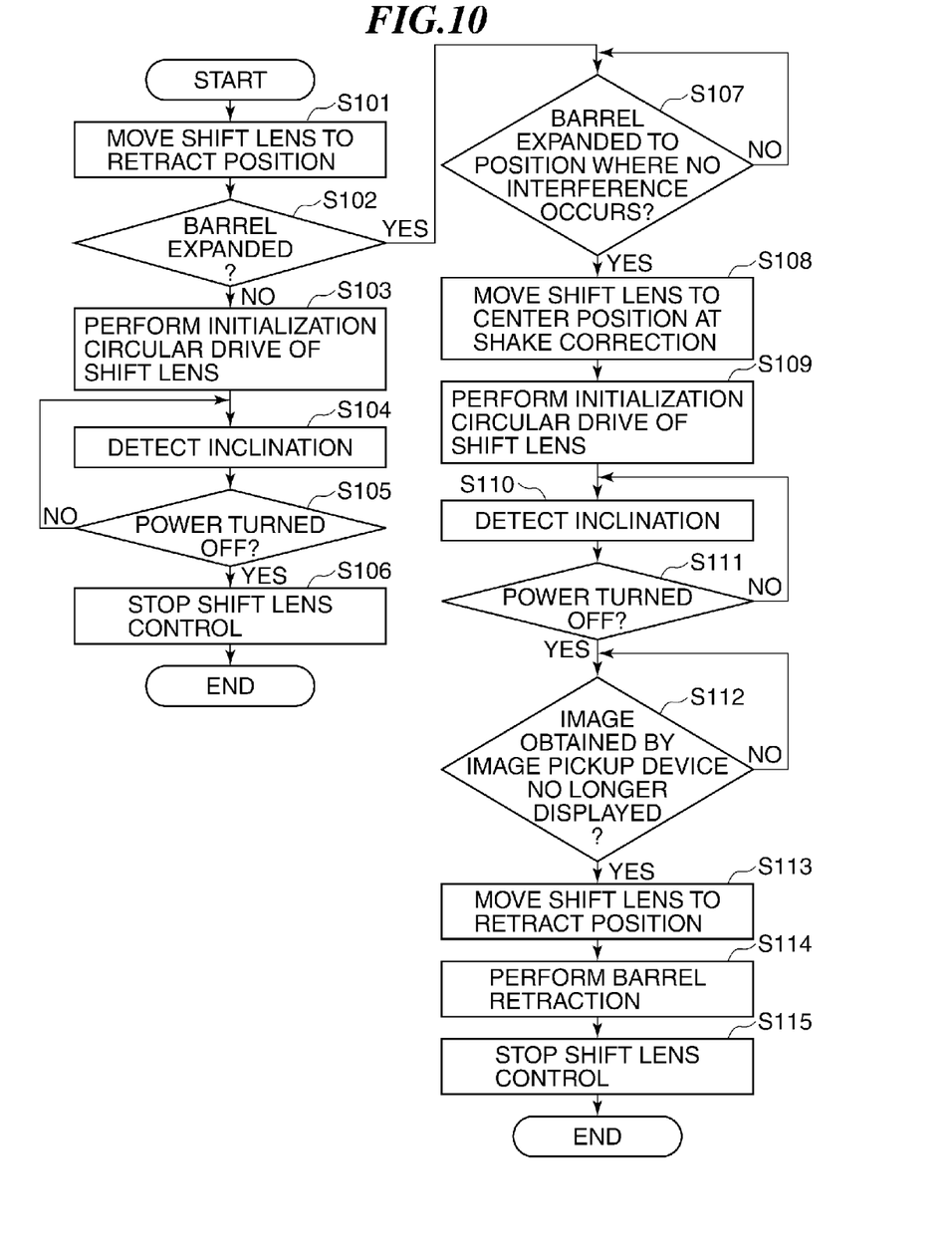
FIG. 10 is a flowchart showing a shift lens retreat process at power on/off of the image pickup apparatus.

Next, operations of the image pickup apparatus at power on/off of the apparatus will be described. FIG. 10 shows in flowchart a shift lens retreat process at power on/off of the image pickup apparatus.

When the power of the image pickup apparatus is turned on, the shift lens drive controller 404 moves the shift lens 403 to a retract position (step S101). In step S102, the control unit 119 determines whether or not the barrel 201 should be or is expanded. For example, the barrel 201 should not be expanded when the power is turned on in an image reproduction mode. If the barrel 201 should not be expanded (NO to step S102), the shift lens drive controller 404 performs initialization circular drive of the shift lens 403 in the initialization condition at the retraction position calculated in step S908 of FIG. 8 (step S103). In step S104, the attitude detector 511 of the shift lens drive controller 404 performs attitude detection (inclination detection) by using the integral control output. The inclination detection is performed until the power is turned off. When the power is turned off (YES to step S105), the shift lens control is stopped (step S106), whereupon the present process is completed.

The barrel 201 is expanded, for example, when the power is turned on in a photographing mode. If the barrel 201 is expanded (YES to step S102), the shift lens drive controller 404 waits for the zoom unit being driven to the zoom pulse position calculated in step S914 of FIG. 8 (step S107). In step S108, the shift lens drive controller 404 moves the shift lens 403 to a center position at shake correction.

Subsequently, in step S109, the shift lens drive controller 404 performs normal initialization circular drive of the shift lens 403. It should be noted that the initialization circular drive must be completed before an image formed on the image pickup device is displayed on the display unit 412. Next, in step S110, the attitude detector 511 performs the inclination detection by using the integral control output.

The inclination detection is performed until the power of the image pickup apparatus is turned off. If the power is turned off (YES to step S111), the shift lens drive controller 404 waits for the image obtained by the image pickup device being no longer displayed on the display unit 412 (step S112). If no image is displayed (YES to step S112), the shift lens drive controller 404 moves the shift lens 403 to the retract position (step S113). When the barrel 201 is brought into the retracted state (step S114), the shift lens control is stopped (step S115), whereupon the present process is completed.

As described above, the shift lens 403 is retreated to a position where the lens does not interfere with another component, thereby making it possible to prevent an error in the detection of attitude of the image pickup device performed based on the drive force for the shift lens 403.

Although a case has been described where this invention is applied to the optical hand shake correction mechanism, this invention is also applicable to an image pickup device type hand shake correction mechanism. In the above-described embodiment, a case has been described by way of example, in which this invention is applied mainly to a digital camera.

However, this invention can also be utilized for a video camera as an image pickup apparatus, an interchangeable lens (for a single-lens reflex camera) as an optical apparatus, and an electronic apparatus such as a cellular phone mounted with an image pickup apparatus.

While the present invention has been described with reference to an exemplary embodiment, it is to be understood that the invention is not limited to the disclosed exemplary embodiment. The scope of the following claims is to be accorded the broadest interpretation so as to encompass all such modifications and equivalent structures and functions.

This application claims the benefit of Japanese Patent Application No. 2009-297679, filed Dec. 28, 2009, which is hereby incorporated by reference herein in its entirety.

What is claimed is:

1. An optical apparatus comprising:
   a lens barrel configured to be capable of being changed over between a retracted state and an expanded state for photographing, the lens barrel comprising a zoom unit for performing a zooming operation, a zoom drive control unit for performing drive control of the zoom unit, a correction member movable in a direction perpendicular to an optical axis, and a drive unit for driving the correction member;
   a shake detection unit configured to detect a shake of the optical apparatus;
   a correction control unit configured to calculate a correction amount for shake correction based on an output from said shake detection unit and to cause said drive unit to drive the correction member based on the calculated correction amount;
   an interference determination unit configured to determine whether or not there is an interference region between said correction member and any one of the zoom unit, the zoom drive control unit, and the drive unit by comparing outputs from said correction control unit at different zoom positions, with each other; and
   an interference prevention control unit configured to calculate the interference region if there is the interference region between said correction member and any one of the zoom unit, the zoom drive control unit, and the drive unit,
   and to instruct the correction control unit to cause said drive unit to drive said correction member to a position where no interference with the any one of the zoom unit, the zoom drive control unit, and the drive unit occurs.

2. The apparatus according to claim 1, wherein said correction control unit includes a proportion controller for performing proportional control, an integration controller for performing integral control, and a differentiation controller for performing differential control, and
   said interference determination unit calculates the interference region based on an output of said integration controller and position information from said zoom drive control unit.

3. The apparatus according to claim 2, further including:
   an attitude detection unit configured to detect an attitude of the apparatus based on the output of the integration controller,
   wherein said attitude detection unit detects the attitude of the optical apparatus after said correction member is moved to the position where no interference with the other member occurs in accordance with the instruction given by said interference prevention control unit.

4. The apparatus according to claim 1, wherein said correction member includes a support movable in a plane substantially perpendicular to the optical axis, a frame that holds the support, balls held between the support and the frame and disposed to roll in recesses formed in at least one of the support and the frame to thereby enable the support to move relative to the frame, and
   said interference prevention control unit controls said zoom drive control unit to perform initialization to place the balls so as not to be in contact with end surfaces of the recesses.

5. The apparatus according to claim 1, wherein said interference prevention control unit instructs to move said correction member to a center position at the shake correction when said barrel is expanded.

6. The apparatus according to claim 1, wherein said interference prevention control unit instructs to move said correction member to a position where said correction member does not interfere with another member when said barrel is retracted, and stops movement of said correction member after said barrel is brought into a retracted state.

7. An image pickup apparatus comprising the apparatus according to claim 1.

8. A control method of an optical apparatus having a lens barrel capable of being changed over between a retracted state and an expanded state for photographing, the lens barrel comprising a zoom unit for performing a zooming operation, a zoom drive control unit for performing drive control of the zoom unit, a correction member movable in a direction perpendicular to an optical axis, and a drive unit for driving the correction member, comprising:
   a zoom drive control step of performing drive control of the zoom unit;
   a shake detection step of detecting a shake of the optical apparatus;
   a correction control step of calculating a correction amount for shake correction based on the shake detected in said shake detection step and causing the drive unit to drive the correction member based on the calculated correction amount;
   an interference determination step of determining whether or not there is an interference region between said correction member and any one of the zoom unit, the zoom drive control unit, and the drive unit by comparing outputs from said correction control step at different zoom positions, with each other;
   an interference prevention control step of calculating the interference region if there is the interference region between said correction member and any one of the zoom unit, the zoom drive control unit, and the drive unit,
   and to instructing the correction control unit to cause the correction member to a position where no interference with the any one of the zoom unit, the zoom drive control unit, and the drive unit occurs.

9. An optical apparatus comprising:
   a lens barrel configured to be capable of being changed over between a retracted state and an expanded state for photographing, the lens barrel comprising a zoom unit for performing a zooming operation, a zoom drive control unit for performing drive control of the zoom unit, a correction member movable in a direction perpendicular to an optical axis, and a drive unit for driving the correction member;
   a shake detection unit configured to detect a shake of the optical apparatus;
   a correction control unit, which comprises a proportion controller for performing proportional control, an integration controller for performing integral control, and a differentiation controller for performing differential control, configured to calculate a correction amount for shake correction based on an output from said shake detection unit and to drive said drive unit based on the calculated correction amount; and an interference prevention control unit configured to calculate an interference region between said correction member and another member based on an output of said integration controller and position information from and position information from said zoom drive control unit, wherein said interference prevention control unit gives said drive unit an instruction to move said correction member to a position where no interference with the other member occurs.

10. The apparatus according to claim 9, further including:

an attitude detection unit configured to detect an attitude of the optical apparatus based on the output of the integration controller, wherein said attitude detection unit detects the attitude of the optical apparatus after said correction member is moved to the position where no interference with the other member occurs in accordance with the instruction given by said interference prevention control unit.

11. The apparatus according to claim 9, wherein said correction member includes a support movable in a plane substantially perpendicular to the optical axis, a frame that holds the support, balls held between the support and the frame and disposed to roll in recesses formed in at least one of the support and the frame to thereby enable the support to move relative to the frame, and said interference prevention control unit controls said zoom drive control unit to perform initialization to place the balls so as not to be in contact with end surfaces of the recesses.

12. The apparatus according to claim 9, wherein said interference prevention control unit gives an instruction to move said correction member to a center position at the shake correction when said barrel is expanded.

13. The apparatus according to claim 9, wherein said interference prevention control unit gives an instruction to move said correction member to a position where said correction member does not interfere with another member when said barrel is retracted, and stops movement of said correction member after said barrel is brought into a retracted state.

14. An image pickup apparatus comprising the apparatus according to claim 9.

* * * * *